INVENTOR
JOHN J. LENTZ
BY John E. Dougherty Jr.
ATTORNEY

Oct. 16, 1962 J. J. LENTZ 3,059,196

BIFILAR THIN FILM SUPERCONDUCTOR CIRCUITS

Filed June 30, 1959

3 Sheets-Sheet 2

United States Patent Office
3,059,196
Patented Oct. 16, 1962

3,059,196
BIFILAR THIN FILM SUPERCONDUCTOR CIRCUITS

John J. Lentz, Chappaqua, N.Y., assignor to International Business Machines Corporation, New York, N.Y., a corporation of New York Filed June 30, 1959, Ser. No. 824,120
19 Claims. (Cl. 338—32)

The present invention relates to superconductor circuits and, more particularly, to thin film superconductor circuits, as well as gating devices for such circuits, which are fabricated of thin film conductors arranged in bifilar fashion.

Probably, the most basic of the modulating or control devices employed in the superconductor circuits of the prior art is what has been lately termed a cryotron. This device comprises a control conductor arranged adjacent a gate conductor which is fabricated of superconductor material and is maintained at a temperature below its transition temperature. The gate conductor is controlled between superconductive and resistive states by signals applied to the control conductor. Examples of circuits employing devices of this nature are found in U.S. Patents No. 2,666,884 and No. 2,725,474, issued to E. A. Ericsson et al and Patent No. 2,832,897, issued to D. A. Buck. One of the most important characteristics of gating devices of this type is the resistance of the gating device when in the normal state. Further, where such devices are used to control the distribution of current between parallel current paths which may, for example, form multistable circuits such as are used in computing and informaton handling systems, it is equally important that the inductance of the entire circuit including the gating devices be kept at a minimum if high speed operation is to be achieved. A further important and desirable characteristic of such gating devices is that of gain, which is usually expressed as the ratio of the current required in the gate conductor to drive the gate conductor resistive in the absence of control conductor current to the current required in the control conductor to drive the gate conductor resistive in the absence of gate conductor current. As is described on page 581 of a summary type article entitled "A Review of Superconductive Switching Circuits," by A. E. Slade et al., which appeared in The Proceedings of the National Electronics Conference, 1957, vol. 13, pp. 574–582; high gating resistance and low inductance can be achieved in wire wound type superconductive circuits by twisting the wire conductors forming the gates in bifilar fashion. However, with this type of arrangement, the desired low inductance and high resistance are achieved at the sacrifice of the Silsbee current characteristic of the gate conductors and, therefore, of the current gain of the circuit. It has also been discovered that superconductor devices and circuits exhibiting the above enumerated desirable characteristics can be realized by fabricating the circuits in the form of thin films and providing superconductor shields adjacent these films. This type of circuitry has the further advantage that it readily lends itself to fabrication by mass production techniques of the type heretofore employed primarily in the printed circuit art. Examples of this circuitry of this type are found in copending applications, Serial No. 625,512, filed November 30, 1956, in behalf of R. L. Garwin and Serial No. 809,815, filed April 29, 1959, now U.S. Patent No. 2,966,647, granted December 27, 1960, in behalf of J. J. Lentz, both of which have been assigned to the assignee of the subject invention.

In accordance with the principles of the subject invention, superconductor gating devices and circuits using such gating devices are provided, wherein the gating devices exhibit a higher resistance in the normal state than has been achievable in the past without sacrificing inductance and/or gain. This highly desirable result is achieved using thin film strip type conductors to form both the circuits and gating devices, with either the strips forming the gate elements of the gating devices of the circuits, and/or the strips forming the control elements, or all of the strips forming the entire circuit being arranged in two adjacent sections so that, when current is flowing in one direction in any one of the sections, the current returns in an opposite direction in an adjacent section of the circuit. This type of arrangement is similar in many respects to the long known bifilar arrangement of wire conductors and for this reason the circuits herein are termed bifilar. However, the circuits of the present invention differ in at least one very important characteristic from conventional bifilar wire conductor circuits in that the adjacent conductors carrying currents in opposite directions do not produce a field of greater intensity at any point near either conductor than would be the case if only a monofilar conductor were employed. In fact, the opposite is true, since with film conductors arranged adjacent each other, or more specifically as shown in the preferred embodiments herein disclosed by way of illustration, arranged one above the other, each conductor serves a function similar to that of a magnetic shield for the corresponding conductor. As a result, the "bifilarly" arranged thin film conductors exhibit a lower inductance and higher Silsbee current than monofilar conductors of the same geometry. Since the gating sections of the circuit are bifilar, two such sections may be driven resistive under the control of a single control conductor, itself having a low inductance, so that each gating element exhibits a high resistance in the normal state. Further, the control conductors may also be bifilar, or arranged in a bifilar current path. With this type construction, the overall inductance of the circuits including the devices is low so that high speed operation is achieved, and since the bifilar conductors, and specifically, the bifilar gate sections exhibit a relatively high Silsbee current, high current gain is realized. Advantages may be realized by designing the circuits so that it is entirely bifilar, or partly monofilar and partly bifilar. For example, the control conductors only or the gate conductors only, or both may be bifilar and other portions of the circuit monofilar. Further, in accordance with the principles of the subject invention, bifilar circuits are provided on a single superconductor shield and between upper and lower superconductor shields. The shields serve to minimize the possibility of trapping flux in the strips forming the circuit and prevent coupling between these strips. In order to provide distinct current return paths in such shields, the circuits may be connected to the shields, and where both upper and lower shields are provided, these shields may be bridged by a further shield in the vicinity of the bifilar gate conductor.

Therefore, an object of the present invention is to provide improved superconductor gating devices and circuits using such devices.

A further object is to provide an improved superconductor gating device exhibiting low inductance, high gating resistance, and high gain.

Still another object is to provide devices and circuits of the above described type of thin film strips of superconductor material which may be laid down using printed circuit type techniques on a planar substrate.

A further object is to provide thin film type bifilar circuits and devices wherein the danger of trapping flux in unwanted portions of the circuit due to misalignment of the bifilar sections of the circuit is minimized.

Another object is to provide high speed, bistable superconductor circuits capable of being connected with one such circuit controlling another of said circuits.

Another object is to provide thin film bifilar superconductor devices.

A further object is to provide improved thin film superconductor circuits including gate and control elements, wherein either the control element or the gate element or both are arranged in bifilar current paths.

Still another object is to provide devices of the last named type and circuits employing such devices wherein superconductor shields are provided which are connected to the circuit and provide distinct current return paths for the conductors forming the circuit.

The foregoing and other objects, features and advantages of the invention will be apparent from the following more particular description of preferred embodiments of the invention, as illustrated in the accompanying drawings.

Figure 4:
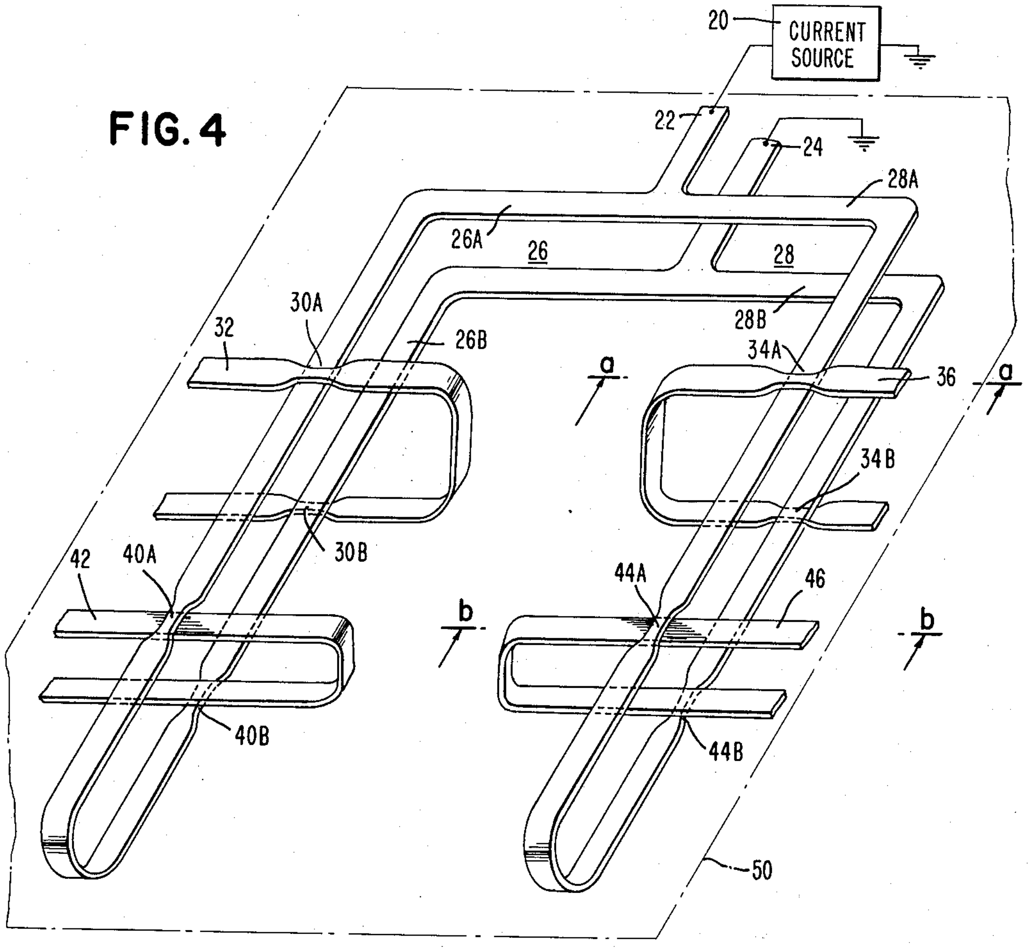
FIG. 4 is a schematic representation of a bifilar superconductor bistable circuit mounted on a superconductor shield.
Figure 4A:
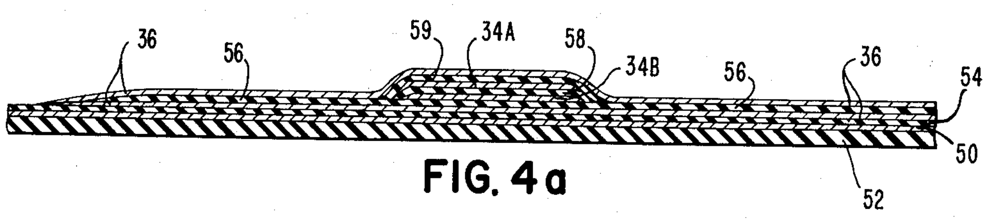
Figure 4B:
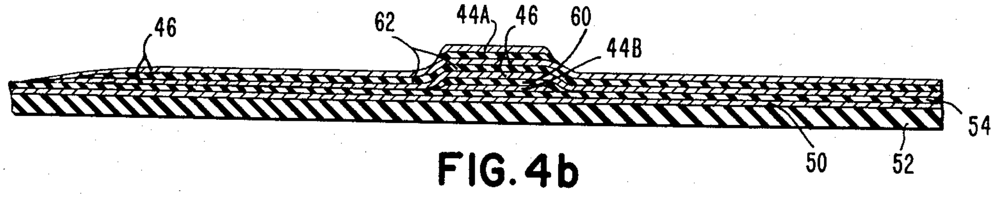

FIGS. 4*a* and 4*b* are sectional views which show in more detail the manner in which the circuit of FIG. 4 is fabricated.

Figure 5:
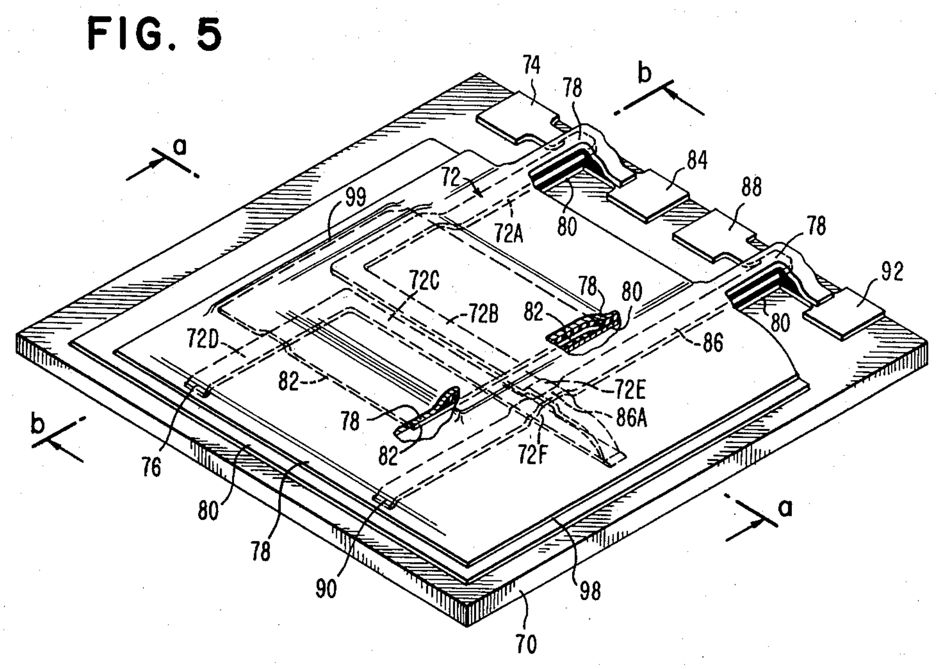

FIG. 5 shows a shielded superconductor circuit having a bifilar gating element and a monofilar control element and connecting conductors, with each of the conductors forming the circuit being arranged between upper and lower shields.

Figure 5A:
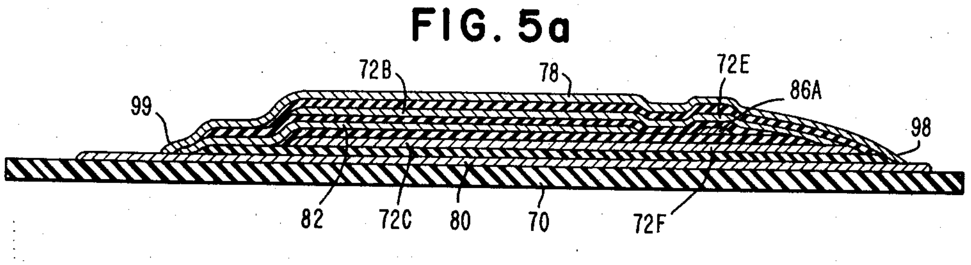
Figure 5B:
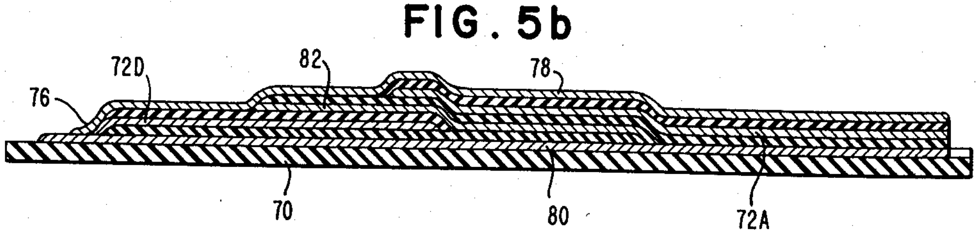

FIGS. 5*a* and 5*b* are sectional views which show in more detail the manner in which the circuit of FIG. 5 is fabricated.

Figure 1:
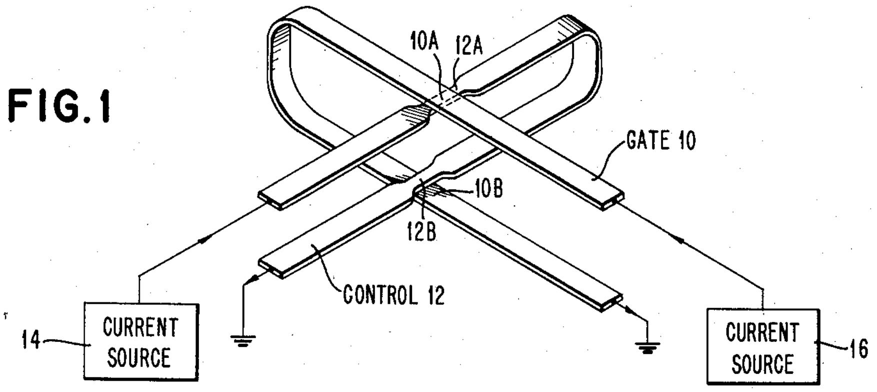
FIGS. 1 and 2 are schematic representations of thin film gating devices employing bifilar gate and control elements.

FIG. 1 is a schematic representation of a cryotron constructed in accordance with the principles of the subject invention. This cryotron includes a gate element 10 and a control element 12. These elements are arranged in what is here termed bifilar fashion, though it is apparent that the conductors are not twisted together as is the usual case with bifilar wire conductors. Further, the device shown in FIG. 1, as well as those shown in other embodiments herein disclosed, are fabricated of thin films of superconductor material and have characteristics very much different than those fabricated of wire stock which is twisted in bifilar fashion in accordance with the long known practice of reducing the inductance of such conductors.

As can be seen from the drawings, the control element is provided with two narrow portions 12A and 12B which traverse portions 10A and 10B of the gate element. These portions of the gate element are fabricated of a soft superconductor material, whereas the remainder of the gate element, as well as the entire control element shown are fabricated of hard superconductor material. The soft superconductor material is here, by way of illustration, tin; the hard superconductor material is lead; and the device is fabricated for operation at a temperature below the transition temperature for the tin. Current is applied to the control conductor 12 by a current source 14 and to gate conductor 10 by a current source 16. As is explained in detail in copending application Serial No. 625,512, filed November 30, 1956, in behalf of R. L. Garwin and assigned to the assignee of the subject invention, by making the control conductor narrower than the gate conductor at the points at which these conductors traverse each other, the device is made to exhibit gain, that is, a small signal applied by the source 14 may be employed to control the resistance presented by the gate to a larger signal applied by source 16.

It should be apparent from the drawings that, if a signal of sufficient magnitude is applied by source 14 to the bifilar control element 12, both of the sections 10A and 10B of the gate element are driven resistive. This is an important feature of the invention, since with the arrangement shown, the amount of resistance introduced into the gate is essentially twice that which may be realized with single strip gates using a single crossing. This important advantage is realized with the structure shown, while at the same time, this structure provides a device having lower inductance and higher Silsbee current characteristics than the monoflar type devices of the prior art. It is in the latter respect, that is, in the Silsbee current characteristic, that the device differs from wire wound bifilar devices. When wire stock is used, and current is applied to the gate fabricated of such material, the current applied to the gate is essentially uniformly distributed and the Silsbee current of the gate, that is, the maximum current that the gate can carry without driving itself resistive, is about what would be expected from the Silsbee hypothesis. Therefore, when a wire wound gate is arranged in bifilar fashion, that is, with two gate wires twisted together, though the total inductance of the gate is lower than that of a single gate wire, this type of arrangement produces a very intense field between the two gate wires, thereby rendering the Silsbee current of the entire gate lower than the Silsbee current of each of the gate wires individually. It is for this reason that the improved inductance and resistance characteristics, which are achieved when wire wound cryotrons are fabricated in bifilar fashion, are accompanied by a decrease in the gain characteristic.

Such is not the case with thin film devices of the type with which the subject invention is concerned. This is so since a current applied to a thin film conductor, which has a width much greater than its thickness, is not uniformly distributed and a large portion of the current carried by the conductor is concentrated near the edges of the film. As a result, a very intense magnetic field is produced near the edges of the film. It is this concentration of current and field at the edges of a thin film conductor which is believed to cause thin film gates to have Silsbee current values which are much lower than would be predicted by the Silsbee hypothesis. By arranging the gate as shown, in bifilar fashion, each of the two sections of the gate, that is, the upper and lower sections thereof, is provided with an image conductor. Thus, when current in the gate flows in one direction in the upper portion of the gate, which includes section 10A, this current is returned in the opposite direction in the lower portion of the gate which includes section 10B. The very presence of the lower section of the gate acts in the same way as a superconductor shield in causing current in the upper section to become more evenly distributed, thereby making it possible for the upper section of the gate to carry a greater current without being driven resistive. The upper section of the gate performs the same function for the lower section of the gate.

Therefore, it can be seen that the Silsbee current is much higher with the arrangement shown in FIG. 1, than with an unshielded monofilar thin film gate strip. When a monofilar gate strip is laid down on a superconductor shield, a similar increase on Silsbee current is, also obtained. However, in the monofilar shielded type construction only a single gate corresponding, for example, to section 10A of FIG. 1, is driven resistive by the associated control conductor, whereas by employing the principles of the subject invention as illustrated by the device of FIG. 1, all of the advantages of using a shield are preserved and, at the same time, the resistance which can be introduced into the gate is doubled.

Therefore, it becomes apparent that the device of FIG. 1 exhibits a gain greater than unity since the gate sections exhibit relatively high Silsbee current; secondly, the device exhibits relatively low inductance; and thirdly, the device exhibits a relatively high resistance when in a normal state, which of course, is an important feature when devices of this type are used in parallel connected circuits wherein current is switched back and forth by selectively introducing resistance into gates connected in the parallel paths forming the circuit. In such circuits, the rate of switching is dependent to a large degree upon the resistance which is selectively introduced into the circuit.

Figure 2:
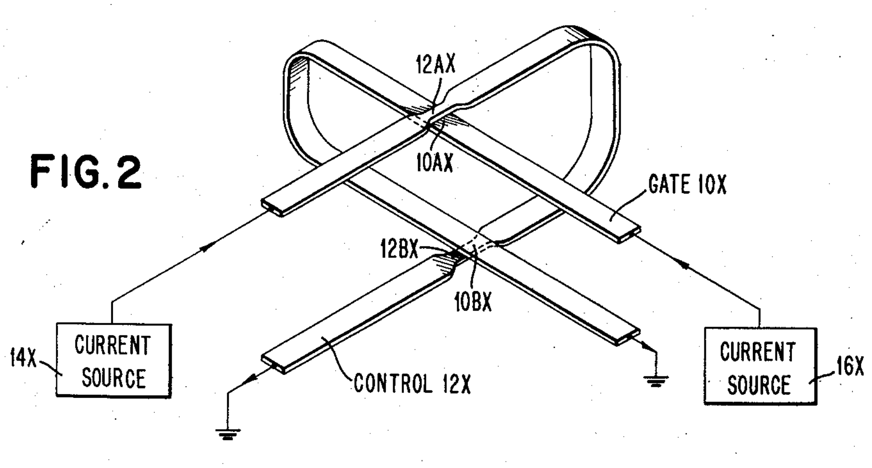

A further embodiment of the invention is shown in FIG. 2 and, in this embodiment, the same reference characteristics as are used in FIG. 1 are employed, with the letter "X" appended. The device of FIG. 2 differs from that of FIG. 1 only in that the control conductor 12, instead of being arranged within the gate conductor is arranged outside the gate conductor. The functional operation of the device is exactly the same as that of the device of FIG. 1 and it exhibits the same characteristics, that is, high gain, low inductance, and high resistance.

Figure 3:
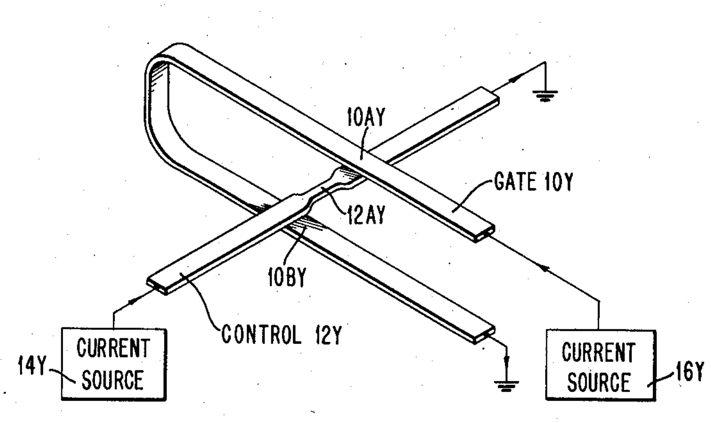
FIG. 3 is a schematic representation of a thin film gating device including a bifilar gate element and a monofilar control element.

A further embodiment of the invention, which is very similar to that of FIGS. 1 and 2, is that of FIG. 3 and the same designations are used in the latter figure as are used in FIG. 1 with the letter "Y" appended. In the device of FIG. 3, a monofilar control element 12Y is employed and it is only the gate element 10Y which is arranged in bifilar fashion. The narrow portion of the gate element, designated 12AY, is effective to drive both of the sections 10AY and 10BY of the gate resistive. This embodiment illustrates that the advantages, above described, may be achieved by arranging only the gate element in bifilar fashion and fabricating the control element using monofilar construction. In the absence of a superconductor shiield, the monofilar control element 12Y of FIG. 3 exhibits higher inductance than the bifilar control element of FIGS. 1 and 2. However, in all other respects, the device of the three figures are similar. The overall inductance is low, the Silsbee current of the gate is high, therefore making high gain achievable; and the resistance of the gate is essentially twice that which can be achieved with a single crossing in monofilar type construction. Further, it is, of course, apparent that circuits may be constructed in accordance with the principles of the invention wherein the gate conductor is monofilar and is controlled by a control section or sections connected in a bifilarly arranged control conductor current path.

FIG. 4 shows, in schematic form, a bistable flip flop circuit which is constructed completely in bifilar fashion. The supply current for the circuit is supplied by current source 20 connected to conductor 22. The current from this source may be directed through one or the other of two paths to a ground terminal 24 for the circuit. The first of these parallel paths is generally designated 26 and includes an upper strip 26A and a lower strip 26B. The other parallel path is generally designated 28 and includes an upper strip 28A and a lower strip 28B.

The upper strip 26A of path 26 is provided with a soft superconductor gate section 30A and the lower strip 26B of this path includes a soft superconductor gate section 30B. The soft superconductor sections 30A and 30B are traversed by narrower sections of a bifilar control conductor 32. When a current pulse is applied to these control conductors both of the gate sections 30A and 30B are driven resistive so that current from source 20 is directed entirely through the other parallel path 28. The upper strip 28A of parallel path 28 is provided with a soft superconductor gate section 34A and the lower strip 28B with a soft superconductor gate section 34B. These soft superconductor gate sections are traversed by a control conductor 36, which is arranged in bifilar fashion and which is effective, when a pulse of sufficient magnitude is applied, to drive both of the gate sections 34A and 34B resistive to switch the current from source 20 back to path 26.

The upper strip of path 26A is provided with a narrow hard superconductor control section 40A and the lower strip 26B of the path is provided with a corresponding narrow hard superconductor control section 40B. Sections 40A and 40B serve as control conductors for the soft superconductor gate sections of a gate conductor 42 which is arranged in bifilar fashion. Thus, when a current from source 20 is directed into path 26, resistance is introduced into both the upper and lower sections of bifilar gate conductor 42, indicating the state of the bistable circuit of FIG. 4. The gate 42 may, of course, be connected to further superconductor circuitry and the resistance of this gate used to switch a current selectively to another parallel path. The upper strip 28A of path 28 is similarly provided with a narrow superconductor control section 44A and the lower strip 28B of the path with a control section 44B. These sections control corresponding soft superconductor gate sections of a bifilar gate conductor 46, so that this gate exhibits resistance when the current from a source 20 is directed to path 28.

It should be noted, the entire circuit of FIG. 4 is arranged in bifilar fashion. With this type of arrangement, each conductor in the circuit is actually provided with what may be termed an image conductor, so that, when there is a current in one of the conductors in the circuit, there is a current in the opposite direction in a conductor which is either immediately above or below it. Therefore, with this type of bifilar construction, it can be seen that each conductor is, in effect, provided with a shield which lowers its inductance and raises its Silsbee current, this latter feature being especially important in regard to the soft superconductor gate sections of the circuit. However, there is the possibility, in fabricating circuits of the type shown in FIG. 4, that the upper and lower sections of the bifilar conductors are not precisely aligned. When this occurs, there is a great danger of trapping persistent current in the conductors forming the circuit. This danger can be obviated by arranging the entire circuit on a superconductor shield such as is diagrammatically illustrated at 50. The presence of this shield does not lower the inductance appreciably from the inductance which is obtained using the bifilar arrangement. However, the problem of precise alignment of bifilar conductors can become a very serious one when circuits such as that shown in FIG. 4 are fabricated by a vacuum evaporation or similar printed circuit type mass production processes. Therefore, the use of shield 50 to prevent the establishing of persistent currents in the various conductors is an important consideration in circuit design, since such persistent currents can have deleterious effects on circuit operation. For example, it has been observed that trapped currents in a gate or control section can cause the characteristics of a cryotron formed thereby to vary with repeated operations. Thus, it can be seen that the shield 50 performs an important function in a circuit of the type shown in FIG. 4. Further, as will be described in more detail with reference to the embodiment of FIG. 5, an upper shield may also be provided and, with this type of construction, that is, using both an upper and lower shield as well as bifilar conductors, the inductance of the circuit is reduced appreciably from that which can be realized with bifilar construction alone.

The embodiment shown in FIGS. 1 through 4 are largely schematic with the geometric patterns being exaggerated to clearly illustrate the various circuit paths. FIG. 4*a* is a sectional view taken through line *a—a* of the device of FIG. 4, wherein the manner in which such a circuit is actually constructed using, for example, vacuum evaporation techniques, is more clearly illustrated. This figure shows the planar substrate on which the circuit is deposited, as well as various layers of insulating material which are not shown in FIG. 4. The substrate is designated 52 and, on this substrate, there is first deposited a shield of hard superconductor material which serves as the shield 50. A layer of insulating material 54 is deposited on top of the shield 50, and thereafter, the lower section of the control element 36. A layer of insulating material 56 is then deposited and, as can be seen in FIG. 4*a*, this layer of insulating material does not extend the entire length of the lower section of the control element, so that, when the upper section of the control element is later deposited, it contacts the lower section at the left end of the device as viewed in FIG. 4*a*. After the insulating layer 56 is deposited, the lower strip 28B of path 28 is deposited and, in the sectional view of FIG. 4*a*, the gate section 34B of this strip is seen. Thereafter, a layer of insulation 58 is deposited on top of gate section 34B and, then, the upper strip 28A, including the gate section 34A which is shown in FIG. 4*a*, is deposited. A layer of insulating material 59 is then deposited and, as can be seen from the drawing, this layer of insulation joins with previously deposited layer 56 to completely insulate the gate sections 34A and 34B from both the upper and lower sections of control element 36. The final step in the evaporation procedure is that of depositing the upper section of control element 36. The left ends of the upper and lower sections of control element 36 are joined at the point at which the layer of insulating material 56 is terminated in order to achieve the bifilar type connection which is shown more graphically in FIG. 4.

In the description above of FIG. 4*a*, reference has only been made to depositing the various layers which form the control and gate sections of the input cryotron for the right hand path of the circuit of FIG. 4. It should be understood that, coincidently with the evaporation of the layers forming these sections, corresponding layers, which form other portions of the circuit of FIG. 4 are also evaporated. FIG. 4*b* is a sectional view taken along the line *b*—*b* of FIG. 4 and serves to illustrate the manner in which remaining portions of the circuit of FIG. 4 are actually constructed to provide the bifilar cryotron shown. As in FIG. 4*a*, the first layer evaporated is the shield 50 and, thereafter, a layer of insulating material 54 which is coextensive with the shield. Thereafter, the lower strip 28B of path 26 is deposited including the control section 44B, which is shown in FIG. 4*b*. On top of this control section, a layer of insulating material 60 is deposited which joins with insulating layer 54 so that control section 44B is completely insulated. The lower section of gate element 46 is then deposited. A further layer of insulating material 62 is deposited on top of the lower section of gate element 46. This insulating layer separates the lower section of gate element 46 from the upper section of this gate element, which is deposited on top of this insulating layer, except at the left hand end of the drawing where the upper and lower sections are connected to provide the desired bifilar type construction. The upper strip 28A of path 28, including the control section 44A which is shown in FIG. 4*b*, is deposited on top of the upper section of gate element 46 to complete the process.

As was pointed out above, the use of a double shield greatly reduces the inductance of superconductor circuits and, at the same time, reduces the possibility of trapping flux in the conductors forming the circuits. A further advantage, which is realized by using both upper and lower shields in fabricating super-conductor circuits of the type to which the subject invention particularly relates, is that the possibility of coupling between conductors in the circuit which are traversed by the same conductor is greatly minimized. Further, where either a single shield or both upper and lower shields are employed, distinct advantages may be realized by connecting the circuit forming conductors to the shield(s), so that the shield(s) provide return paths for a current applied to these conductors. Circuits constructed in accordance with this principle are shown and described in detail in copending application Serial No. 809,815, filed April 29, 1959, in behalf of the inventor in whose behalf the subject application is filed. These principles may be employed to advantage in combination with the principles of bifilar construction to provide superconductor circuits having a large number of desirable characteristics. An embodiment of such a circuit is shown in FIG. 5.

In the embodiment of FIG. 5, the conductors forming the circuit are monofilar with the exception of the actual gate conductor section which is bifilar. The circuit is provided with both upper and lower shields, so that the entire circuit exhibits a low inductance. Connections are provided from the circuit to the shields so that the shields serve as return paths for current applied to the circuit. A third shield is provided which bridges the upper and lower shields at points adjacent the bifilar sections of the gate conductor. With this type of construction, the possibility of trapping persistent currents in the circuit forming conductors is minimized as is the possibility of producing circulating currents in the shield; the gate portion of the circuit exhibits a relatively high Silsbee current; and the gate, since it is bifilar and includes two distinct sections that are driven resistive by the control conductor, exhibits a relatively high resistance when in its normal state.

The gate conductor path of the circuit of FIG. 5 is generally designated 72 and extends from an input current terminal or land 74 to a junction 76 at which it is connected to both the upper and lower shields, which are here designated 78 and 80, respectively. The return path for current in the gate conductor path extends through both of these shields and through a bridging shield 82, in a manner which will be explained in detail below, to a current return terminal for the gate conductor.

As can be seen from the drawings, gate path 72 is partly monofilar and partly bifilar and includes a monofilar strip 72A, which extends from terminal 74, two strips 72B and 72C which are arranged in bifilar fashion, and a monofilar strip 72D which extends to junction 76. The soft superconductor sections of gate path 72, which are selectively driven resistive by current in a control conductor 86, are designated 72E and 72F and form part of the upper and lower strips 72B and 72C of the bifilar portion of the gate path. The control conductor 86 extends from a current input terminal at land 88 between the upper and lower shields 78 and 80 to a junction at 90 with both of these shields. The upper and lower shields provide return paths immediately above and beneath control conductor 86 to current return terminal 92 for the control conductor current. Control conductor 86 is provided with a narrow control section 86A which extends between the gate sections 72E and 72F of gate path 72. Both of these gate sections are selectively controllable between superconductive and resistive states by current signals applied to the control conductor.

Portions of the structure of FIG. 5 are broken away to reveal more details of inner construction and, specifically, to show the connections between the bridging shield 82 and the upper and lower shields 78 and 80. Referring to the broken away portion to the right of the section 72B of the gate conductor path 72 as viewed in FIG. 5, it can be seen that the lower shield 80 is there connected to the bridging shield 82. Upper shield 78 and lower shield 80 are not connected at this point but are insulated one from the other as they extend to the upper edge of the board as viewed in this figure, along which the input and output terminals are arranged. Individual connections between these shields are provided at lands 84 and 92. The broken away section, shown below the conductor 72C as viewed in FIG. 5, reveals that at this point the upper shield 78 is connected to the bridging shield 82. Lower shield 78 is not connected to either the upper or bridging shield at this point but the upper and lower shields 78 and 80 are connected along the lower edge of the structure as viewed in this figure, where gate and control conductor paths 72 and 86 are connected at junctions 76 and 90 to both of these shields. The upper and lower shields are also connected to each other along the right hand edge of the structure which is geenrally designated 98. Further, all of these shields are connected along the left edge of bridging shield 82 which is generally designated 99. The manner in which the connection between the upper, lower and middle shields are made, and the manner in which the gate and control conductors are arranged are illustrated in more detail in FIGS. *5a* and *5b* which are sectional views taken, respectively, along the lines *a—a* and *b—b* of FIG. 5.

The purpose of the bridging shield 82 is to provide distinct upper and lower current return paths in the shields for the current supplied to the gate conductor path 72 and, in this way, to minimize the possibility of producing in the shields stray circulating currents which might occur when only upper and lower shields are provided adjacent the bifilar strips 72C and 72B of the gate conductor path. Considering the control conductor 86, it can be seen that both upper and lower return paths are provided by the upper and lower shields 78 and 82. However, because of the bifilar arrangement of the gate conductor path with strips 72C and 72D arranged one above the other, the bridge shield 82 is necessary to provide distinct upper and lower return paths for the current in the gate conductor circuit. These two return paths for the gate conductor current extend in the shields from junction 76 to the terminal at land 84. The first of these paths may be traced from junction 76 in lower shield 80 beneath the strips 72D and 72C to a point along the edge of the structure designated 98 where the lower shield joins the upper shield. This first return path then continues in the upper shield immediately above strip 72B and, thence, above strip 72A to land 84. The second return path extends from junction 76 in the upper shield immediately above strip 72D of the gate circuit to the junction between the upper shield 78 and bridging shield 82. This return path extends from this point along the lower surface of bridging shield 82 in a path immediately above strip 72C of the gate circuit and, thence, back along the upper surface of the bridge shield 82 in a path immediately beneath strip 72B and a part of strip 72A of the gate circuit to the point at which the bridging shield 82 is connected to the lower shield 80. This return path extends from this point in the lower shield 80 to terminal 84. With this type of arrangement it can be seen that each of the conductors in the circuit of FIG. 5 is provided with both upper and lower return current paths in the shields and that, when current is flowing in any one of these circuit conductors, with the exception of the outer extremities of the bifilar portins of the gate conductor circuit adjacent edge 98, return currents flow in an opposite direction in paths in the shield immediately above and below that circuit conductor.

While the invention has been particularly shown and described with reference to preferred embodiments thereof, it will be understood by those skilled in the art that various changes in form and details may be made therein without departing from the spirit and scope of the invention.

What is claimed is:

1. A low inductance, a high gating resistance superconductor gating device comprising; first and second superconductor planar strips laid down one above the other on a planar substrate; the width of each of said strips being much greater than the thickness thereof; said strips being connected to each other at one end thereof and across a current source at the other end; whereby current from said source flows in one direction in one of said strips and back in the other direction in the other of said strips; a further superconductor planar strip laid down on said substrate traversing each of said first and second strips; at least the portions of said first and second strips which are traversed by said further strip being controllable between superconductive and resistive states by signals applied to said further strip.

2. A superconductor gating device comprising; a bifilar planar thin film gating element including first and second planar sections arranged one above the other and connected in series with a current source for said gating element; whereby current from said source flows in one direction in one of said sections and back in the other direction in the other of said sections; each of said first and second sections having a higher Silsbee current and a lower inductance in the presence of the other of said sections than in the absence thereof; and a control conductor means for said gating element traversing said first and second sections thereof and effective when energized to drive each of said sections from a superconductive to a resistive state.

3. A superconductor gating device comprising; a bifilar superconductor current path including first and second planar gate sections laid down one above the other on a planar substrate; the width of each of said gate sections being appreciably greater than the thickness thereof; a current source for said current path with which said first and second sections thereof are connected in series; whereby current from said source flows in one direction in one of said gate sections and back in the opposite direction in the other of said gate sections; each of said sections having a higher Silsbee current and a lower inductance in the presence of the other of said sections than in the absence thereof; and a control conductor means for said current path traversing said first and second gate sections thereof and effective when energized to drive each of said gate sections from a superconductive to a resistive state.

4. The device of claim 3 wherein said superconductor current path and control conductor means are arranged adjacent superconductor shielding means.

5. In a superconductor circuit; a planar substrate; a plurality of planar superconductor strips laid down on said substrate forming said circuit; said strips forming superconductor gating elements and superconductor control elements arranged adjacent said gating elements for controlling said gating elements between superconductive and resistive states; each of said superconductor gating elements being arranged in bifilar fashion and including two gate sections each having a width appreciably greater than its thickness; said gate sections being arranged one above the other and connected in series in said circuit; whereby current applied to any one of said gating elements flows in one direction in one of the gate sections thereof and in an opposite direction in the other of the gate sections thereof.

6. The circuit of claim 5 wherein each of said control elements is arranged in monofilar fashion and extends between the gating sections of the gate element which it controls.

7. The circuit of claim 5 wherein each of said control elements is arranged in bifilar fashion and includes first and second control sections arranged one above the other; each of said first and second control sections traversing a corresponding one of the first and second gate sections of the gating element controlled by the control element.

8. The circuit of claim 5 wherein said circuit is provided with superconductor shielding means electrically connected to said superconductor strips forming said circuit.

9. A superconductor gating device maintained at a superconductive temperature comprising; a superconductor gating element comprising first and second planar gate sections arranged adjacent each other; a current source for said gating element; said adjacently arranged gate section of said element being connected in series with said current source so that current from said source flowing in one direction in one of said gate sections flows in an opposite direction in the other of said gate sections; the width of each of said gate sections being much greater than the thickness thereof whereby the current from said source in either of said gate sections provides a magnetic field which is more uniform in the presence of the other gate section than in the absence thereof; and a control conductor means for said gating device traversing said gate sections of said gating element for controlling both of said gate sections between superconductive and resistive states.

10. A superconductor bistable circuit maintained at a superconductive temperature; said circuit including first and second thin film superconductor paths connected in parallel across a current source; each of said paths comprising first and second planar superconductor strips arranged one above the other and connected in series with said current source whereby current from said source flowing in one direction in one of the strips thereof flows in the opposite direction in the other of the strips thereof; the width of each of said strips being much greater than the thickness thereof; each of said strips including a planar gate section with the gate section of the first strip in each path being arranged adjacent the gate section of the second strip of that path; and means for controlling the state of said circuit comprising first and second control conductor means traversing the first and second gate sections of said first and second paths, respectively.

11. A superconductor bistable circuit maintained at a superconductive temperature; said circuit including first and second parallel paths connected in parallel across a current source; said first path including first and second planar thin film gate sections arranged one above the other and connected in series with said source; said second path including third and fourth planar thin film gate sections arranged one above the other and connected in series with said current source; the width of each of said gate sections being appreciably greater than the thickness thereof; first control conductor means traversing said first and second gate sections of said first path; and second control conductor means traversing said third and fourth gate sections of said second path.

12. The circuit of claim 11 wherein each of said parallel paths is entirely bifilar; said first path including first and second thin film strips arranged one above the other with said first gating section being a part of said first strip and said second gating section being a part of said second strip; and said second parallel path including third and fourth thin film strips with said third gating section being part of said third strip and said fourth gating section being part of said fourth strip.

13. The circuit of claim 11 wherein each of said control conductor means is a bifilar thin film conductor with first and second series connected thin film control sections arranged one above the other; the first and second control sections of said first control conductor means being arranged adjacent said first and second gate sections of said first parallel path; and the first and second control sections of said second control conductor means being arranged adjacent said third and fourth gate sections of said second parallel path.

14. A superconductor circuit formed of thin film planar strips of superconductor material; said strips forming gating elements and control elements; the strips forming said gating elements being arranged in bifilar fashion and each including two gate sections arranged one above the other both of which being controllable between superconductive and resistive states by an associated one of the control elements; the strips forming the control elements being arranged in bifilar fashion and each including two control sections arranged one above the other for controlling the state of an associated one of the gating elements; and superconductor shielding means arranged adjacent said strips forming said circuit for preventing flux trapping in said strips forming said circuit.

15. A superconductor circuit formed of thin film planar strips of superconductor material; said strips forming gating elements and control elements; the strips forming said gating elements being arranged one above the other in bifilar fashion and each including two gate sections both of which are controllable between superconductive and resistive states by an associated one of the control elements; the strips forming the control elements being arranged one above the other in bifilar fashion and each including two control sections for controlling the state of an associated one of the gating elements.

16. A superconductor gating device comprising; a bifilar superconductor current path including first and second planar gate sections laid down one above the other on a planar substrate; a current source for said current path with which said first and second sections thereof are connected in series; whereby current from said source flows in one direction in one of said gate sections and back in the opposite direction in the other of said gate sections; each of said sections having a higher Silsbee current and a lower inductance in the presence of the other of said sections than in the absence thereof; a control conductor means for said current path traversing said first and second gate sections thereof and effective when energized to drive each of said gate sections from a superconductive to a resistive state; and superconductive shielding means arranged adjacent said superconductor current paths; said superconductive shielding means including a first superconductor shield arranged between said substrate and said first and second gate sections, a second superconductor shield arranged between said first and second gate sections, and a third superconductor shield arranged above said first and second gate sections.

17. The device of claim 16 wherein said superconductive current path is connected to said shielding means and said first, second and third shielding means are connected to each other.

18. In a superconductor circuit; a bifilar superconductor gating device including first and second planar gate sections arranged one above the other; first, second and third shields for said circuit; said first shield being arranged beneath said bifilar gating device; said second shield being arranged between said first and second gate sections of said bifilar gating device; said third shield being arranged above said bifilar gating device; and control conductor means arranged adjacent said gating device for applying magnetic fields to said gating device to control said first and second gate sections of said gating device between superconductive and resistive states.

19. In a superconductor circuit; a planar strip of superconductor material folded back upon itself to form a bifilar superconductor gating device; first and second superconductor shields, one arranged above said gating device and the other arranged below said gating device; said gating device being electrically connected to said first and second shields; a third shield extending between the folded sections of said gate strip and bridging said first and second shields; and control conductor means arranged adjacent said gating device for applying magnetic fields to said gating device to control said gating device between superconductive and resistive states.

References Cited in the file of this patent

UNITED STATES PATENTS

| | | |
|---|---|---|
| 1,422,130 | Reynolds | July 11, 1922 |
| 2,521,894 | Brown | Sept. 12, 1950 |
| 2,666,884 | Ericsson et al. | Jan. 19, 1954 |
| 2,914,735 | Young | Nov. 24, 1959 |
| 2,919,432 | Broadbent | Dec. 29, 1959 |
| 2,966,647 | Lentz | Dec. 27, 1960 |
| 2,989,714 | Park et al. | June 20, 1961 |